(12) United States Patent
Bindhammer

(10) Patent No.: US 8,299,635 B2
(45) Date of Patent: Oct. 30, 2012

(54) POWER GENERATOR

(75) Inventor: Markus Bindhammer, Shanghai (CN)

(73) Assignee: MATRIX GmbH, Woerth/Isar (DE)

( * ) Notice: Subject to any disclaimer, the term of this patent is extended or adjusted under 35 U.S.C. 154(b) by 535 days.

(21) Appl. No.: 12/604,656

(22) Filed: Oct. 23, 2009

(65) Prior Publication Data
US 2010/0320774 A1 Dec. 23, 2010

(30) Foreign Application Priority Data

Jun. 19, 2009 (EP) ................................ 2009163282

(51) Int. Cl.
*H02P 9/04* (2006.01)
(52) U.S. Cl. ............................................. 290/1 A; 123/1
(58) Field of Classification Search .................. 290/1 A; 123/1–3
See application file for complete search history.

(56) References Cited

U.S. PATENT DOCUMENTS

| | | | | |
|---|---|---|---|---|
| 4,595,841 A * | 6/1986 | Yaguchi | ......................... | 290/1 A |
| 6,397,791 B1 * | 6/2002 | Brister | ...................... | 123/41.15 |
| 6,750,556 B2 * | 6/2004 | Sodemann et al. | ........... | 290/1 A |
| 6,758,169 B2 * | 7/2004 | Suzuki et al. | ...................... | 123/3 |
| 6,792,897 B2 * | 9/2004 | Higuchi et al. | .................... | 123/2 |
| 6,917,121 B2 * | 7/2005 | Akimoto et al. | ............... | 290/1 A |
| 7,089,889 B2 | 8/2006 | Johnson et al. | .................... | 123/2 |
| 7,098,424 B2 * | 8/2006 | Silvestro | ........................ | 219/133 |
| 7,471,000 B1 * | 12/2008 | Ruiz | ............................. | 290/1 A |
| 7,705,478 B2 * | 4/2010 | Hirose et al. | .................... | 290/1 A |
| 8,093,732 B2 * | 1/2012 | Hatsugai et al. | ............... | 290/1 A |
| 2003/0184094 A1 | 10/2003 | Sodemann et al. | | |
| 2004/0168654 A1 | 9/2004 | Radtke | ............................ | 123/2 |
| 2008/0054858 A1 | 3/2008 | Uchimi et al. | .................. | 322/17 |

FOREIGN PATENT DOCUMENTS

| | | |
|---|---|---|
| DE | 4201077 | 7/1993 |
| DE | 202005007928 | 9/2005 |
| JP | 1-266020 A | 10/1989 |

* cited by examiner

*Primary Examiner* — Truc Nguyen
(74) *Attorney, Agent, or Firm* — Andrew Wilford

(57) ABSTRACT

A portable generator unit has a frame, a generator fixed on the frame, a combustion engine fixed on the frame and coupled to the generator to drive it, a fuel tank, and means securing the tank to the frame for pivoting between a use position with the tank overlying and closely juxtaposed with the engine and generator and a maintenance position pivoted up and spaced from and giving access to the engine and generator.

13 Claims, 3 Drawing Sheets

POWER GENERATOR

FIELD OF THE INVENTION

The present invention relates to a portable generator. More particularly this invention concerns a generator unit powered by an engine.

BACKGROUND OF THE INVENTION

Such a portable generator unit typically has a generator, a combustion engine powering the generator, and a fuel tank all carried on a common frame.

Portable generator units known from the prior art generally serve for producing electric energy where line power is not available. These portable generator units are available in a wide variety of manufacturing sizes. The portable generator units are equipped with a generator for producing electric energy and the generator is powered by a combustion engine in turn powered with fuel. Before use by the engine, the fuel is stored in the tank. In smaller and/or portable generator units, the tank is mounted in most cases above the engine. Furthermore, the prior art discloses frames within which the respective components of portable generator units can be arranged.

Such a portable generator unit is known from DE 20 2005 007 928, for example. The generator and the combustion engine are firmly fixed in a housing. During maintenance work the housing must be laboriously opened by undoing a number of connections, a significant waste of time.

Another portable generator unit is known from DE 42 01 077. Here, the combustion engine is mechanically coupled to a generator. The fuel tank is integrated in the outer wall of the housing in order to save housing components. The fuel tank is held in place by screws. An access door damper is provided on the housing in order to get to parts requiring maintenance. It may be necessary in practice, however, to gain access to the entire engine or the entire generator in order to carry out some repair or maintenance jobs.

OBJECTS OF THE INVENTION

It is therefore an object of the present invention to provide an improved power generator.

Another object is the provision of such an improved power generator unit that overcomes the above-given disadvantages, in particular whose combustion engine and/or generator can easily and quickly be accessed for maintenance.

SUMMARY OF THE INVENTION

A portable generator unit has according to the invention a frame, a generator fixed on the frame, a combustion engine fixed on the frame and coupled to the generator to drive it, a fuel tank, and means securing the tank to the frame for pivoting between a use position with the tank overlying and closely juxtaposed with the engine and generator and a maintenance position pivoted up and spaced from and giving access to the engine and generator.

The generator can be an electric generator such as a linear generator or a rotary generator, for example. The combustion engine can be a gas or a diesel engine. The combustion engine is preferably directly coupled with the generator via a shaft. Different geometric scopes for design can be chosen regarding the tank. Angular forms, round forms or a combination of geometric forms can be chosen, for example, for the tank walls. The tank walls define an interior space in which fuel is stored. Furthermore, at least one side of the tank is provided with at least one fill hole, usually at the top of the tank. At least one tank wall is provided has another opening for transferring the fuel to the combustion engine, this opening normally being at the lowest part of floor of the tank. The transfer of the fuel to the combustion engine can be carried out by a typical flexible fuel line or hose.

The generator and/or the combustion engine can be retained via screwed fastenings at the frame, for example. Furthermore, fixed connections between the frame and combustion frame and/or generator, such as welds, glued joints, snap connectors or other closures, are possible.

According to the invention, the tank is connected with the frame so as to pivot. The connections can be, for example, via pivot joints. Furthermore, the tank can be provided with a tubular connection rod, for example. Besides, the frame can be provided with connecting pins which extend into the connection rod so that a pivoting of the tank is enabled. The pivotable connection between frame and tank is preferably designed in such a way that pivoting of the tank is about a horizontal axis. Furthermore, the pivotal connection is designed in such a way that the combustion engine and the generator are at least partially accessible after pivoting up of the tank. This gives good access for maintenance work. A support for the tank in the lifted position as well as preferably a latch in the lowered position can also be provided. The support can be designed by a fold-out tent prop or by a suitable joint locking or also by a gas strut or the like, for example.

The tank can also be detachable from the frame. The connection can be designed in such a way, for example, that a removable latch, or clips or snap-action connection can be provided between the tank and the frame. However, other embodiments are imaginable, in which the tank is fixed on the frame by screwed fastenings or similar connecting elements. Besides, the removable connection between the tank and the frame has the advantage that the tank can be used as a canister for the transport of liquid fuel. This way the tank can be filled with fuel directly at a gas station, for example, after removal from the portable generator unit. A complicated transfer of liquid between fuel tank and tank can be avoided with this embodiment.

A fuel line can be provided within the scope of the invention by which a connection between the tank and the combustion engine can be made in order to transfer fuel from the tank to the combustion engine. Hereby, a quick-release coupling can be provided on one end or on both ends or also over the fuel line in order to remove the tank and/or the fuel line simply and quickly. Typical quick coupling systems providing a reliable seal when disconnected so that the design of the quick coupling does not need to be described in further detail.

Polymer is a possible material for the design of the tank. As for the polymer, thermoplastics, thermosetting resins or elastomers can be used, for example. Side walls can be provided on the frame that can be made of the same material as the polymer tank. As a matter of course, the tank can also be made of metal, such as sheet steel or of a light metal, for example. As for polymer tanks, different materials are likewise possible, but they need to be impervious to the fuel and preferably should have a low rate of diffusion.

If the portable generator unit is being used, then the tank should be in a down use position. This way the tank rests on parts of the frame, for example, and is preferably locked in place. Hence the tank is in effect one with the side walls of the frame. The housing body can be designed in such a way that it surrounds the engine and the generator at least partially. This is particularly advantageous with respect to the reduction of the noise level as well as an increased safety of the user. The covering can protect parts of the generator from dirt and dust.

In order to further reduce the noise level of the portable generator unit, a muffler for the engine is provided according to an embodiment of the invention. The muffler can be positioned in the front part of the portable generator unit. A higher security of the user is provided by this possible arrangement since this way the combustion engine is further shielded in the front part of the portable generator unit from unintended contact with the user. Here the front part of the portable generator unit is preferably a part underneath the pivot hinge for the tank and/or a part near the engine, that is a part of the generator remote from the generator.

For additional sound absorption it can be furthermore of advantage, if the inner sides of the cover are provided with sound-absorbing coatings, such as with foamed material or the like, for example. It can also be advantageous to set the entire unit of engine and generator in the frame in a vibration-cushioned manner so that less vibration is transferred directly to the frame and therethrough to the side walls of the generator. An additional vibration-cushioned or vibration decoupled bedding of the tank can reduce on the one hand sound generation and thus any tendency to outwardly transmit sound. Furthermore, such a bedding makes sure that the fuel is not subject to vibrations and can be transferred smoothly, that is with lesser pressure impulses through the fuel line.

At least two wheels are positioned in the lower part of the frame. These serve for moving the portable generator unit easier. The wheels can be made of polymer, for example.

A handle can also be provided at the frame. The handle can be fixed to the frame in such a way that it can pivot about a horizontal axis through an angle larger than 0° and not exceeding 180°. Thus the handle can move between a rest or nonuse position so that it compactly fits against the generator unit. The handle can be furthermore brought into the use position by pivoting up so that moving the portable generator unit is done by the user with the aid of the handle.

The handle can be preferably arranged at the frame in such a way that it can be pivoted through about 90°. In this embodiment, connecting elements can be furthermore provided between the handle and the frame for temporary fixing of the handle is enabled in either or both end positions. Furthermore, these means can be designed in such a way that releasing of the fixation can be carried out by manual operation so that a pivoting of the handle is enabled.

The portable generator unit is also provided with plugs or sockets for extracting electricity. These plugs and sockets can vary with regard to quantity and function. Several sockets with different or same voltage can be available, for example. The voltages can be 230V and/or 400V, for example.

The frame can be designed as an assembly of bars or rods. Compared with flat frame elements, such a frame is more advantageous because of weight reduction. However, also varieties of the frame are imaginable with which the frame can be made of light metal, manufactured in a casting process, preferably one piece or multi-part, or made of ribbed polymer, manufactured in an injection molding process.

Furthermore, a cover plate can be provided in the rear part of the portable generator unit for the safety of the user and for a reduction of the noise level. This rear part is opposite the muffler.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
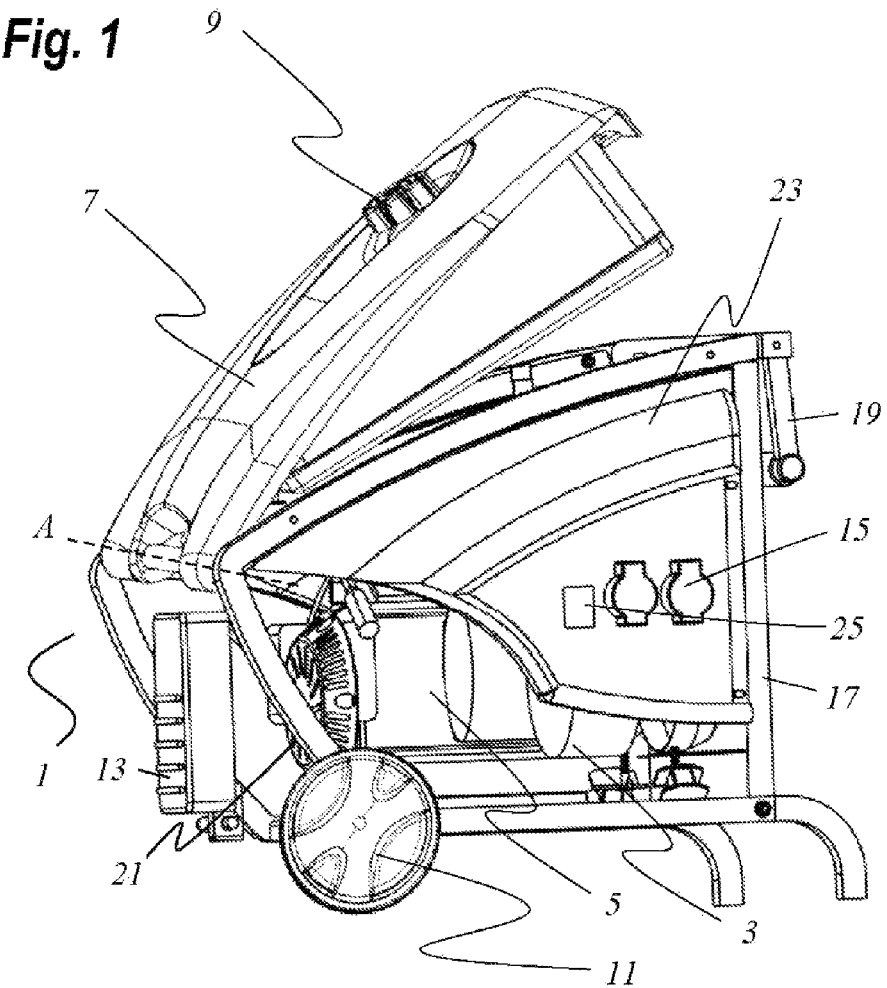
FIG. 1 is a perspective view of the generator according to the invention from the front with the tank pivoted up into the maintenance position.

As seen in FIG. 1 a portable generating unit 1 has a support frame 17 carrying a combustion engine 5, a generator 3 and a tank 7. The frame 17 is designed as an assembly of rigid square-section tubes. The tank 7 can pivot up as shown in FIG. 1, so that the combustion engine 5 and the generator 3 are accessible. This pivoting is about a horizontal axis A at the upper front region of the frame 17. The engine 5 has a perforated cover over an unillustrated cooling fan. A muffler 13 is mounted on the front end of the frame 17. Thus the engine 5 is positioned safely so that it is not likely to touch a user of the machine.

The tank 7 has a fill opening for fuel provided with a removable screw-type cap 9. Wheels 11 are provided on the bottom of the frame 17. Power is outputted at one or more sockets 15 on the side of the unit 1. The sockets 15 can vary in quantity and design. Several sockets 15 can all supply the same voltage, or some can be set up to deliver different voltages.

Figure 2:
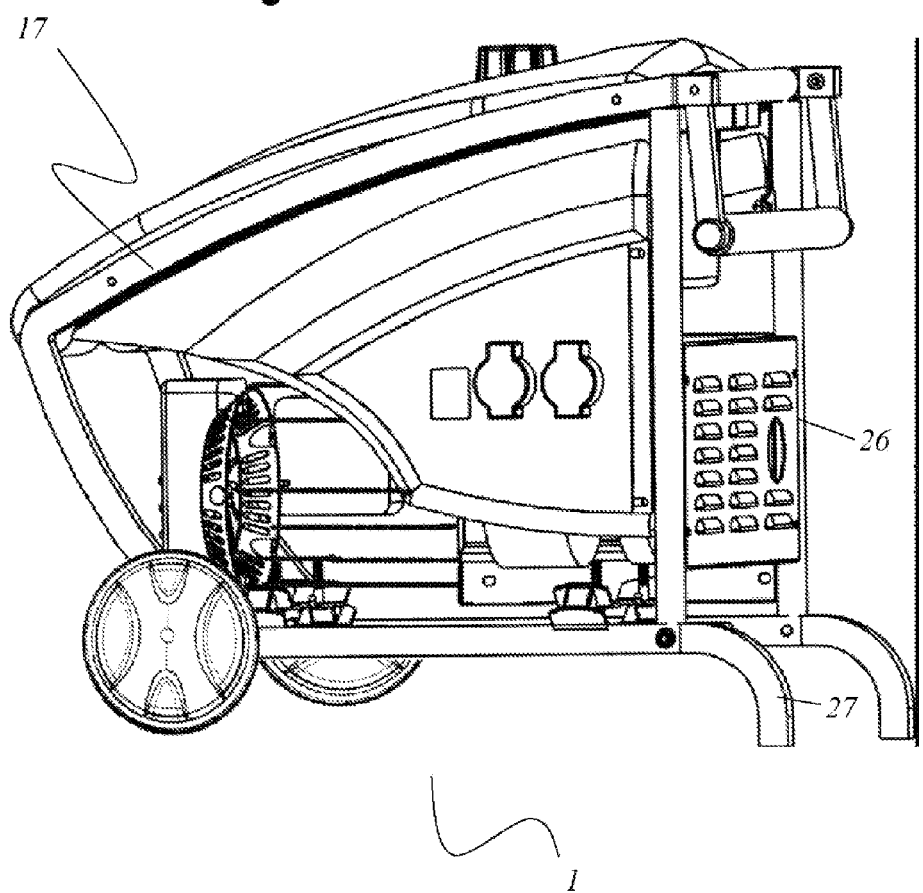
FIG. 2 is a perspective view of the portable generator unit from the back and in the operating position.

Furthermore, a handle 19 is positioned on the rear end of the frame 17 in the illustrated embodiment. The handle 19 can be pivoted about a horizontal rear axis B as shown in FIG. 2 by an arrow. In the FIGS. 1 and 2 the handle 19 projects downward from the axis B in a rest position when the portable generator unit 1 is operating. To move the unit 1 the handle 19 is raised up by about 90° to a fixed use position. Connecting elements between the handle 19 and frame 17 are provided that have to be released in order to drop the handle 19 back into the rest position it assumes when the unit 1 is operating.

Side walls 23 made of polymer are also provided on the frame 17. They serve for the safety of the user in order to prevent unintended contact with the combustion engine 5 and/or with the generator 3. In addition, the side walls 23 serve to reduce the noise level of the portable generator unit 1.

FIG. 2 shows the portable generator unit 1 from the back. A cover plate 26 is mounted on the rear end of the frame 17 to prevent unintended contact of the user with the generator 3. Furthermore, parking legs 27 are provided for stabilization of the portable generator unit 1 during operation.

The perspective view of FIG. 2 shows the portable generator unit 1 with its tank 7 in an operating or use position. Unlike the pivoted-up maintenance position of the tank 7 according to FIG. 1 the tank 7 is pivoted down and essentially resting on the frame 17 immediately above the engine 5 and generator 3. According to FIG. 2 the tank 7 rests in a use position in which the portable generator unit 1 operate. The tank 7 and the side walls 23 fit complementarily together. It can be advantageous to lock the tank 7 in the shown operating position with the frame 17.

Figure 3:
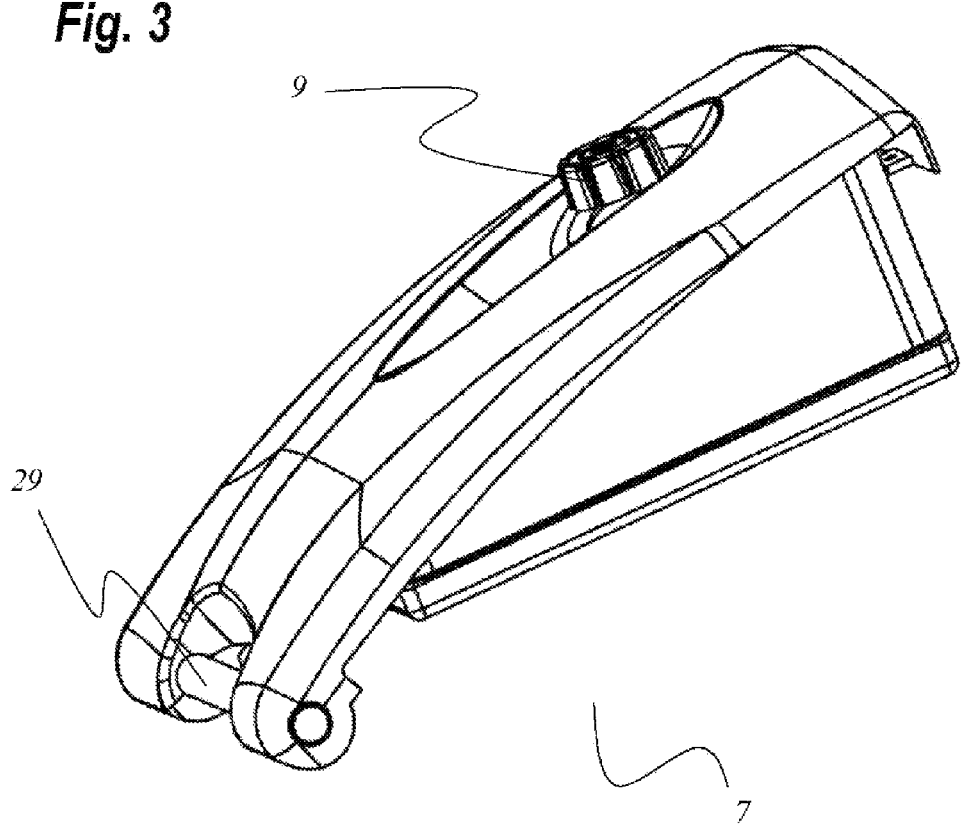
FIG. 3 is another perspective view of only the tank of the generator according to the invention.

The further perspective view of FIG. 3 shows the tank 7 of the portable generator unit 1 when detached. The tank 7 is provided with a detachable connection or pivot rod 29 defining the pivot axis A.

The invention was described with reference to a preferred embodiment. It is obvious for a skilled person, however, that modifications or changes of the invention can be carried out without departing from the scope of the following claims

I claim:

1. A portable generator unit comprising:
   a frame;
   a generator fixed on the frame;
   a combustion engine fixed on the frame and coupled to the generator to drive it;
   a fuel tank; and
   means securing the tank to the frame for pivoting between a use position with the tank overlying and closely juxtaposed with the engine and generator and a maintenance position pivoted up and spaced from and giving access to the engine and generator.

2. The portable generator unit defined in claim 1 wherein the means allows separation of the tank from the frame.

3. The portable generator unit defined in claim 1, further comprising
   a fuel line connecting the tank to the engine; and
   a quick-connect coupling in the line.

4. The portable generator unit defined in claim 1 wherein the tank is made of a polymer.

5. The portable generator unit defined in claim 1 wherein the frame has polymer side walls.

6. The portable generator unit defined in claim 5 wherein the tank fits complementarily between the side walls in the use position.

7. The portable generator unit defined in claim 5 wherein the generator and engine are largely between the side walls.

8. The portable generator unit defined in claim 1, further comprising
   a muffler connected to the engine and underneath the tank in the use position.

9. The portable generator unit defined in claim 1, further comprising
   at least two wheels on a lower portion of the frame.

10. The portable generator unit defined in claim 1, further comprising
    a handle on an upper portion of the frame.

11. The portable generator unit defined in claim 10 wherein the handle is pivotal on the frame between a rest position closely juxtaposed with the frame and a use position projecting outward from the frame.

12. The portable generator unit defined in claim 1 herein the frame is formed as an assembly of rigid bar-like elements.

13. The portable generator unit defined in claim 1, further comprising:
    a muffler connected to the engine and mounted at one end of the frame and
    a cover plate at an opposite end of the frame.

* * * * *